US006936119B2

(12) United States Patent
Förster et al.

(10) Patent No.: US 6,936,119 B2
(45) Date of Patent: Aug. 30, 2005

(54) METHOD FOR PRODUCING METALLIC, NON-ROTATIONALLY SYMMETRICAL RINGS WITH A CONSTANT WALL THICKNESS OVER THEIR CIRCUMFERENCE

(75) Inventors: Wilfried Förster, Gröditz (DE); Joachim Schlegel, Freiberg (DE); Dieter Wamser, Röderau-Bobersen (DE); Roland Stephan, Riesa (DE)

(73) Assignee: Mannesmannrohren-Werke AG, Mulheim a. d. Ruhr (DE)

( * ) Notice: Subject to any disclaimer, the term of this patent is extended or adjusted under 35 U.S.C. 154(b) by 190 days.

(21) Appl. No.: 10/332,839

(22) PCT Filed: Jul. 11, 2001

(86) PCT No.: PCT/DE01/02561

§ 371 (c)(1),
(2), (4) Date: Jan. 13, 2003

(87) PCT Pub. No.: WO02/04166

PCT Pub. Date: Jan. 17, 2002

(65) Prior Publication Data

US 2003/0164210 A1 Sep. 4, 2003

(30) Foreign Application Priority Data

Jul. 12, 2000 (DE) .......................................... 100 34 937
Jul. 6, 2001 (DE) .......................................... 101 34 776

(51) Int. Cl.[7] .............................................. C21D 8/10
(52) U.S. Cl. ....................... 148/589; 148/593; 148/909; 148/651; 148/649
(58) Field of Search ................................. 148/648, 651, 148/909, 593, 589, 590

(56) References Cited

U.S. PATENT DOCUMENTS

| 3,927,450 A | * 12/1975 | Sommer et al. | ........ 29/898.066 |
| 5,424,028 A | 6/1995 | Maloney et al. | .............. 420/38 |
| 5,958,158 A | 9/1999 | Kron et al. | .................. 148/598 |

FOREIGN PATENT DOCUMENTS

| WO | WO 96/27460 | 9/1996 | ........... B21D/53/84 |
| WO | WO 99/07495 | 2/1999 | ........... B21D/53/00 |

OTHER PUBLICATIONS

D.N. Hawkins, "Warm Working of Steels", Elsevier Science Publishers B.V., pp. 5–21, 1985.

* cited by examiner

Primary Examiner—Deborah Yee
(74) Attorney, Agent, or Firm—Cohen, Pontani, Lieberman & Pavane

(57) ABSTRACT

The invention is directed to a method and a device for producing metal, non-rotationally symmetric rings with a constant wall thickness along their circumference, particularly cam rings, starting from a hot-rolled pipe from which individual portions are severed, mechanically machined and subsequently hardened and tempered. Ring blanks of equal width are severed from the pipe and are mechanically machined on all sides, and the non-rotationally symmetric shape is produced by cold forming, the pipe or the severed ring blank having a structure suitable for cold forming.

6 Claims, 5 Drawing Sheets

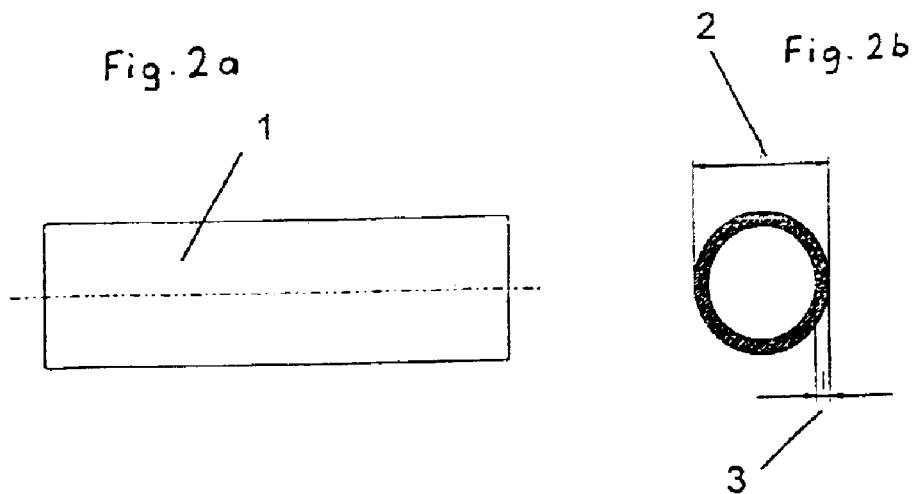
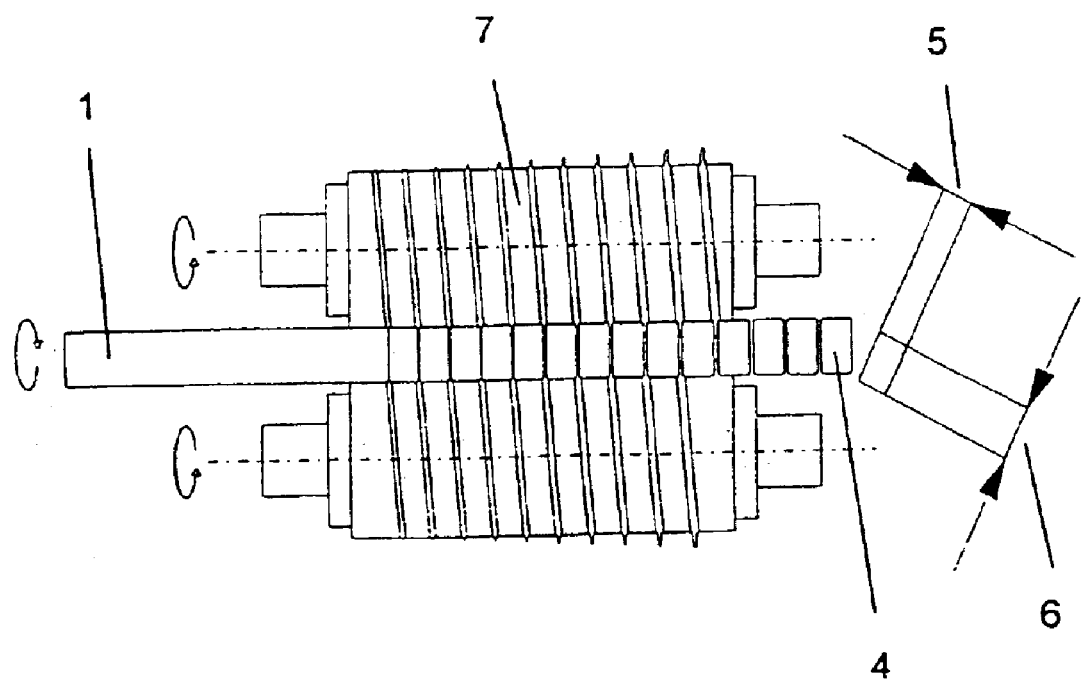

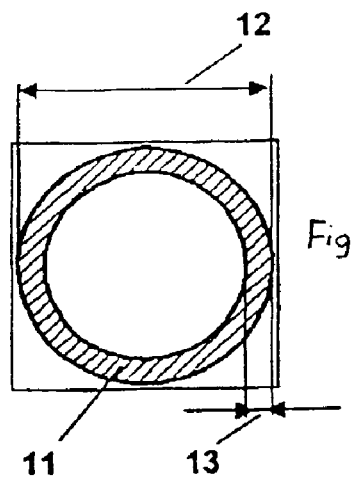
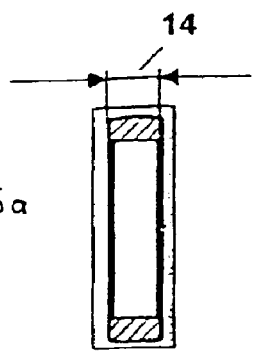
Fig. 5a  Fig. 5b
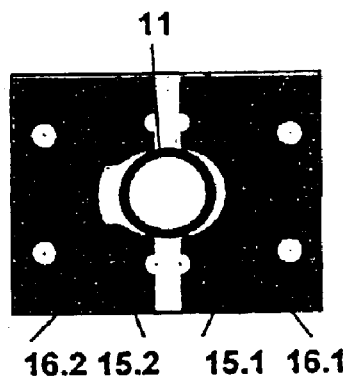
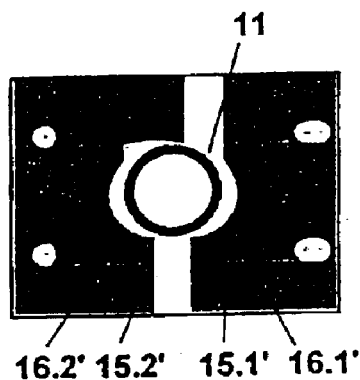
Fig. 5c  Fig. 5d
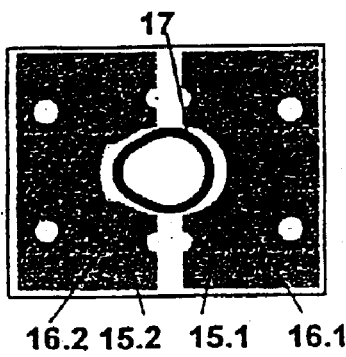
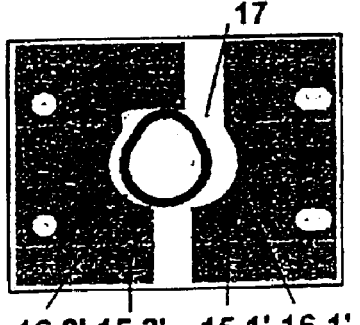
Fig. 5e  Fig. 5f
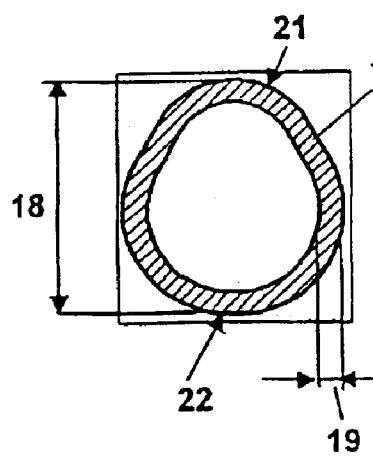
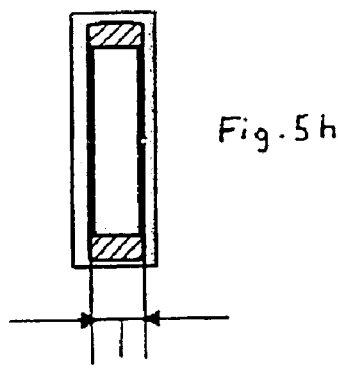
Fig. 5g  Fig. 5h

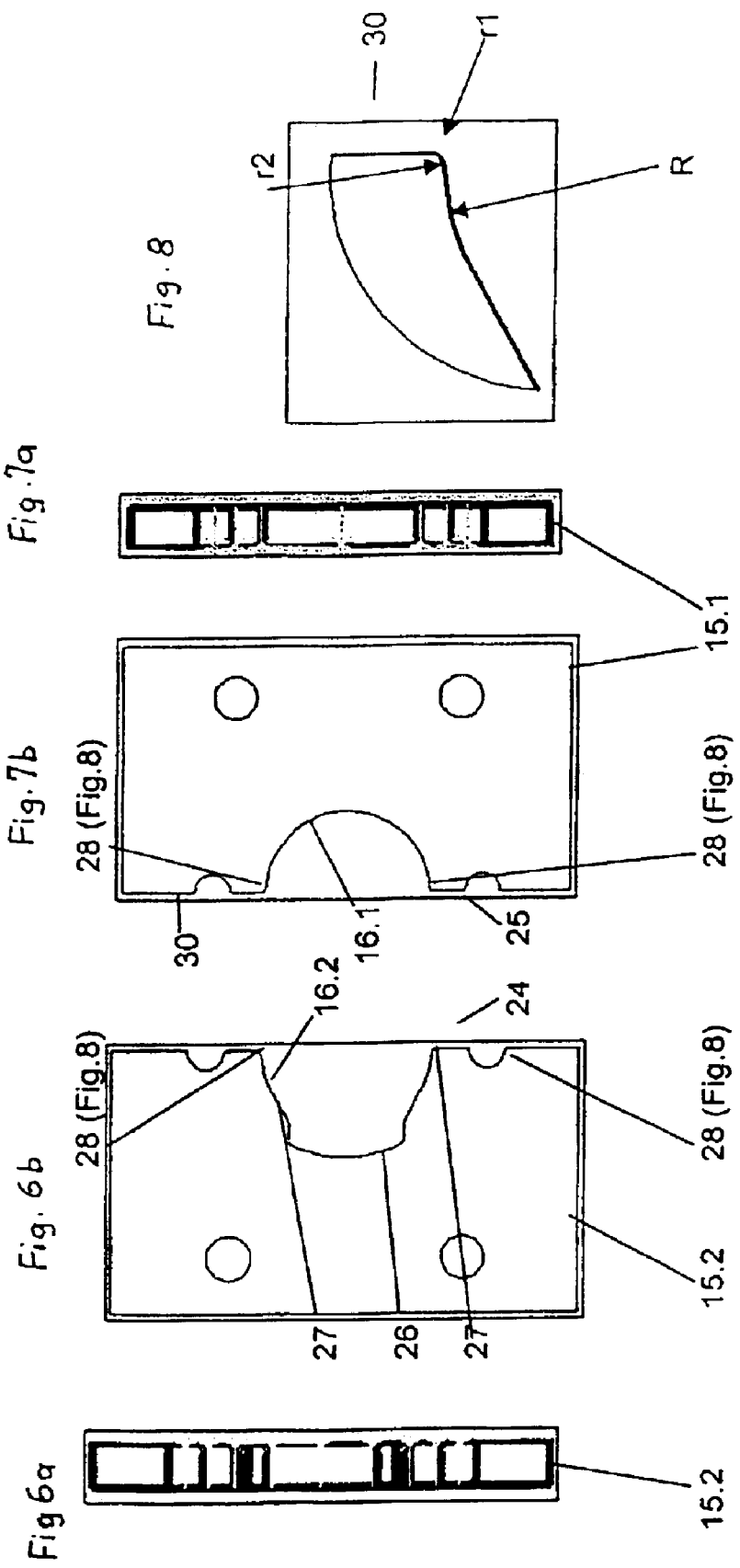

METHOD FOR PRODUCING METALLIC, NON-ROTATIONALLY SYMMETRICAL RINGS WITH A CONSTANT WALL THICKNESS OVER THEIR CIRCUMFERENCE

PRIORITY CLAIM

This is a U.S. national stage of application No. PCT/DE01/02561, filed on 11 Jul. 2001. Priority is claimed on that application and on the following applications: Country: Germany, Application No.: 100 34 937.4, Filed: 12 Jul. 2000; and Country: Germany, Application No.: 101 34776.6, Filed: 06 Jul. 2001.

BACKGROUND OF THE INVENTION

1. Field of the Inventions

The invention is directed to a method for producing metal, non-rotationally symmetric rings with a constant wall thickness along their circumference, particularly cam rings, starting from hot-rolled pipe from which individual portions are severed, mechanically machined, and subsequently hardened and tempered.

2. Description of the Related Art

In the effort to reduce specific fuel consumption in automobiles and utility vehicles, possible reductions in the weight of the vehicle have become especially important. The camshaft is viewed as one possibility for potentially economizing on weight. In a first step, the solid-cast or forged camshaft was replaced by a hollow shaft and the individual cam rings were slid into the hollow shaft and connected thereto. Shrinking, soldering or welding are selected as connection techniques. More recently, it has been attempted to use hydroforming or internal high-pressure forming (IHPF) as a connection technique. The rings must have a non-rotationally symmetric shape in order to utilize a positive engagement in addition to the frictional engagement for securing.

According to the prior art, the following known techniques can be used to produce non-rotationally symmetric rings. In a first method, a hot-rolled thick-walled pipe is used as starting material. The thick-walled pipe is inserted as a bar into a multispindle machine with a bar loader and the desired non-rotationally symmetric shape is fashioned from the thick wall by means of CNC turning and CNC milling. The finish-turned or finish-milled non-rotationally symmetric rings are finally hardened and tempered. This procedure has the disadvantages of high material input (<30% yield) and the high cost of CNC turning and milling.

Another method uses a section pipe whose cross-sectional shape comes very close to the desired final shape. Portions of this section pipe are severed and the end faces are chamfered or beveled either by means of a separate turning process or by tumbling. The high cost of material for the drawn section pipe, the low cycle time for severing the portions, and the added expenditure for beveling are disadvantageous in this method.

SUMMARY OF THE INVENTION

It is the object of the invention to provide a method for producing non-rotationally symmetric rings with a constant wall thickness along their circumference, particularly cam rings, which makes do with a reduced material input and shorter cycle times compared to the known prior art.

According to the inventive teaching, unworked rings or ring blanks of equal width are severed from the pipe and are mechanically machined on all sides. The non-rotationally symmetric shape is then produced by cold forming in one or two steps. In so doing, it must be ensured that the pipe or the severed ring blank has a structure which permits cold forming without cracks or flaws. An optimum outer diameter and inner diameter of the machined circular ring is aimed for by taking into account the surface constancy based on the cross-sectional surface of the finished non-rotationally symmetric ring.

The suggested method has the advantage that material input is low and yield is high. An even more decisive effect is achieved in that only short cycle times are required for the mechanical machining of the rings, including beveling. Also, the final cold forming is possible within a short cycle sequence. Cutting is especially productive when the pipe is severed by continuous hot cutting. With respect to the hot cutting and the mechanical machining of the severed rings, reference is made to the example of producing roller bearing rings disclosed in WO 99/07495. The turning operations required for the circular rings are reduced to a few steps because the production of the elaborate grooved contour in roller bearing rings is dispensed with. Stamping by means of two forming blocks in horizontal arrangement is preferably suggested for cold forming. This method can be automated in a simple manner and can be carried out with short cycle times and low tool costs.

Alternatively, the cold forming of the circular ring to form the non-rotationally symmetric ring can also be carried out by means of a forming die or a stamping mandrel. In the former case, the circular rings are pushed through the die; in the latter case, they are pulled over the stamping mandrel. The required shaping forces are higher because substantial friction forces must be overcome when pushing or pulling.

As a rule, cold forming in one step is sufficient for many applications. With very close tolerances, i.e., small grinding stock allowance, a two-step cold forming may be required. For example, the stamping described above as a first cold forming step would be followed by re-sizing in a second step. In this connection, the die is split at a 90-degree offset and the sizing is directed to the radii.

The known process of internal high-pressure forming (IHPF) can also be used for the desired cold forming. For this purpose, a plurality of circular rings are arranged adjacent to one another in a closeable die and are pressed into the desired shape from the inside by a high-pressure connection.

The known roller bearing steel, particularly 100Cr6, has proved to be the most successful in the roller bearing industry. Since the rolling process for the cam-rocker arm with roller in internal combustion engines roughly corresponds to the demands of a roller bearing, the known roller bearing steel is also usable for this purpose. A pipe which is finish-rolled in a regulated manner and which has a structure similar to the spheroidized cementite structure is used in a known advantageous manner (DE 19513314 A1, to which U.S. Pat. No. 5,958,158 corresponds). This use of a pipe which is finish-rolled in a regulated manner has the advantage that the costly spheroidization and adjustment can be dispensed with because the subsequent hot cutting does not require adjustment or straightening of the hot-rolled pipe. The low hardness in the range of 230–250 HB after hot cutting makes it possible to carry out cold forming with low pressure so that the swelling effect is minor.

In case of special requirements, it may be advisable to spheroidize the ring blanks after hot cutting in order to prevent very small microcracks in the course of cold forming. Alternatively, the pipe can be annealed in this way before cutting.

It is suggested as another step for preventing microcracks that the non-rotationally symmetric rings are subjected to recrystalization annealing after cold forming and before hardening.

A forming die with two blocks is suggested for carrying out the cold forming. The inner contour of one block roughly corresponds to a half-circle and the inner contour of the second block cooperating with the latter roughly corresponds to a trapezoid. The height of the trapezoid is greater than the radius of the half-circle of the first block. The purpose of this suggested shape of the blocks is so that free spaces remain in certain locations in the block contour in the area in which the contour deviating from the circular shape is to be formed and, therefore, so that no damaging pressure is exerted on the workpiece. Such pressures can lead to internal stresses which have a negative influence on distortion during hardening and tempering. Since the magnitude of stresses results differently in every ring, the tolerance presets can only be adhered to with difficulty.

The trapezoidal contour of the second block is also characterized in that the closed shorter side is curved in a slightly convex manner and the two legs pass into a radial portion whose radius is somewhat smaller than the radius of the inner contour of the first block.

In order to decrease stress peaks in the edge area of the blocks, each of the two blocks is provided with a rounded bevel in the area of the separation point.

Depending on the wall thickness, it may be advantageous to design the forming blocks in such a way that the height of the trapezoid is either vertical to or parallel to the parting point of the forming blocks.

Further features, advantages and details of the invention are indicated in the following description of an embodiment example represented in a sequence of essential method steps.

BRIEF DESCRIPTION OF THE DRAWING

FIGS. 2a, 2b show the starting pipe;

FIG. 3 is a schematic illustration of the hot cutting;

FIGS. 5a–h show the stamping for producing the cam ring;

FIGS. 6a,b are a front view and top view of a block of a forming die;

FIGS. 7a,b are a front view and a top view of the second block of a forming die;

FIG. 8 shows detail X from FIG. 7b.

DETAILED DESCRIPTION OF THE PRESENTLY PREFERRED EMBODIMENTS

Figure 1:
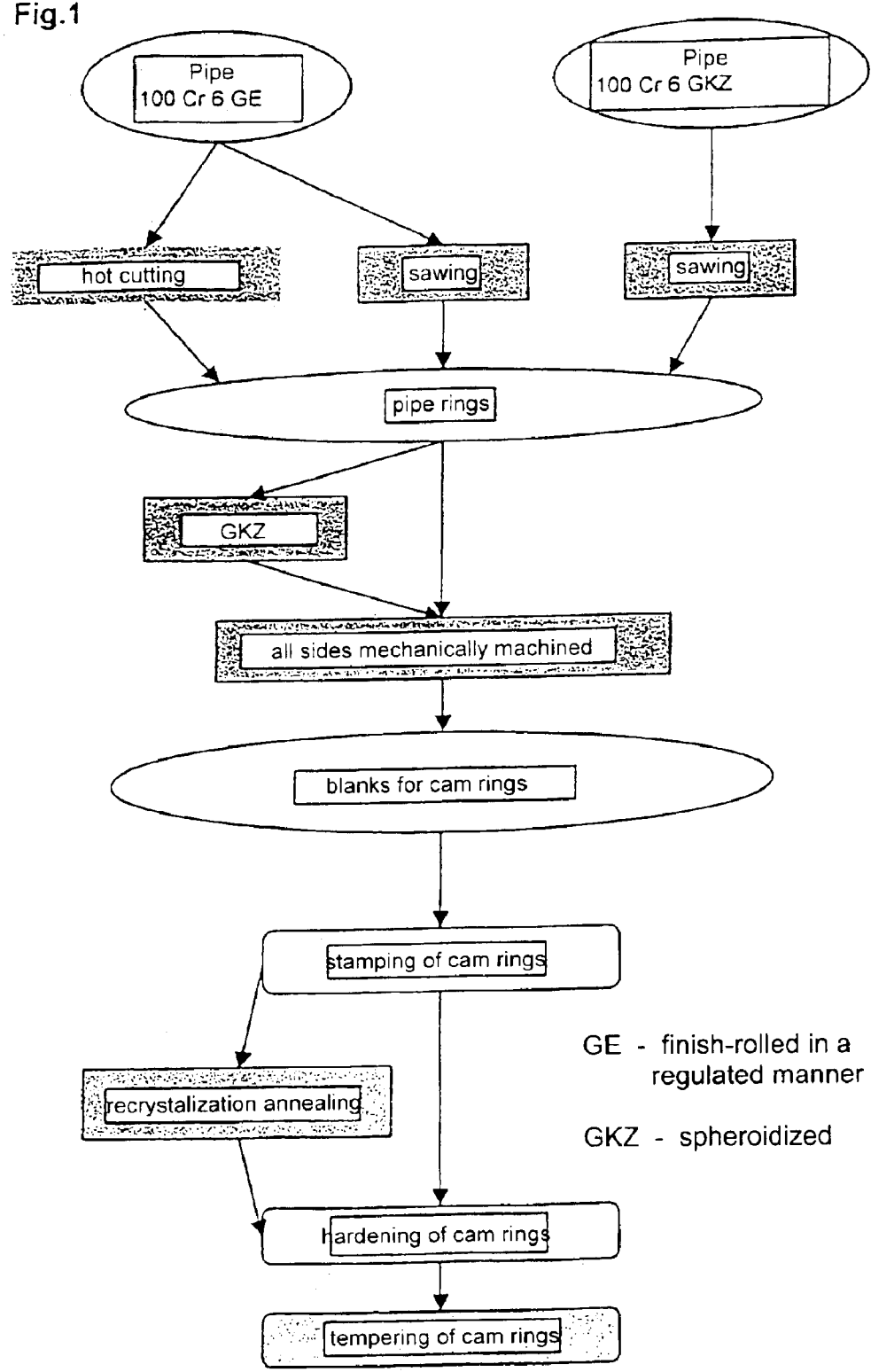
FIG. 1 shows a flowchart of the possible manufacturing modes for producing non-rotationally symmetric rings, particularly cam rings.

The possible manufacturing modes for producing non-rotationally symmetric rings, particularly cam rings, are shown schematically in FIG. 1.

A hot-finished pipe of roller bearing steel, particularly 100 Cr 6, which has been finish-rolled in a regulated manner (left-hand side) or spheroidized after rolling is taken as a starting point. Cutting can be carried out by means of hot cutting or cold sawing. The ring blanks which are produced in this way are mechanically machined on all sides. When hot cutting is used, the severed ring blanks are also optionally spheroidized prior to mechanical machining. The blanks produced in this way form the starting product for the non-rotationally symmetric rings. The circular rings are pressed into the desired shape, e.g., in the shape of a cam ring, by a cold stamping. The cam rings are hardened in a final treatment and are then tempered in order to retain the desired final strength and hardness. The cam rings are optionally subjected to recrystalizing annealing after cold forming and prior to the final treatment.

The essential method steps for producing a cam ring are shown in a concrete example in FIGS. 2 to 5. According to FIG. 2, a hot-finished pipe 1 of roller bearing steel, particularly 100 Cr 6, which is finish-rolled in a regulated manner is supplied to a hot Cutting installation as starting material directly from the cooling bed, i.e., is not adjusted and not straightened. In this embodiment example, the outer diameter 2 of the pipe 1 is 39.6 mm with a wall thickness 3 of 5.25 mm. The supplied length is six meters.

Figure 4C:
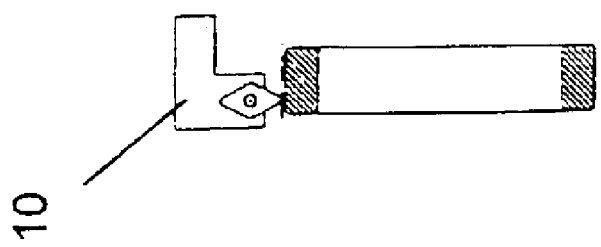
FIGS. 4a–c show the mechanical machining on all sides.
Figure 4B:
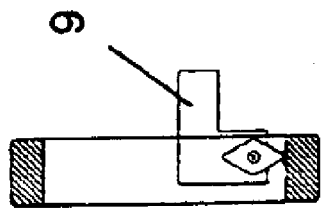
Figure 4A:
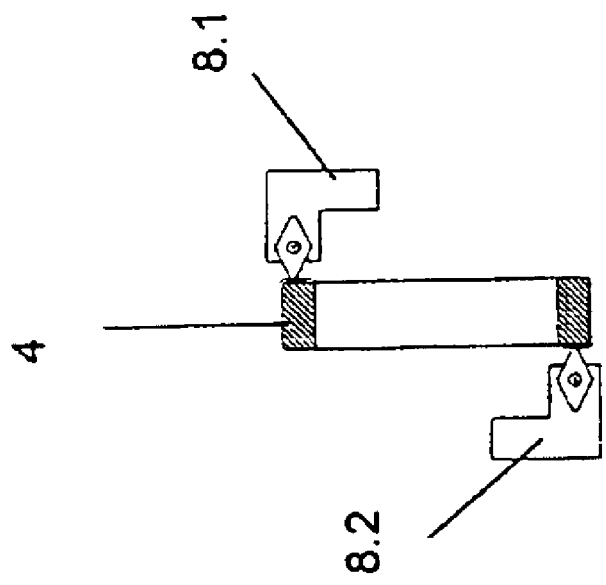

In the hot cutting installation, the pipe 1 is preheated to 720° C. and ring blanks 4 are hot-cut from the pipe 1 in a continuous manner by means of three cutting rolls 7 which are arranged in an axially parallel manner at an offset of 120° (FIG. 3). The outer diameter 6 of the ring blank 4 is 39.55 mm and the width 5 is approximately 9.5 mm. The hardness is about HB 240. The mechanical machining of the ring blank 4 is carried out in a multiple-step machining station in which the workpiece to be machined is cyclically transported in the circuit (FIG. 4). In this embodiment example, the mechanical machining comprises CNC turning in two clamping processes. The two end faces are machined by two tools 8.1, 8.2 and the inner contour is machined by another tool 9 and the bevels are worked in. After reclamping on a clamping mandrel, the outer surface is machined by another tool 10. After this mechanical machining, the circular ring 11 has an outer diameter 12 of 38.45 mm and a wall thickness 13 of 4.07 mm. The width 14 is 8.2 mm.

The type of cold forming used in this case to shape a cam ring 17 from the circular ring 11 is stamping by means of two forming blocks 15.1, 15.2 and 15.1', 15.2' (FIG. 5). The parting plane can be selected so as to extend vertical to (left-hand half) or parallel to (right-hand half) the center of the highest dimension of the cam ring 17 to be produced. The inner contour 16 and 16', respectively, of the forming blocks 15.1, 15.2 and 15.1', 15.2' is selected in such a way that the desired final shape is achieved as accurately as possible taking into consideration the elastic swelling and the dimensional change after hardening and tempering.

After stamping, the cam ring 17 has a height 18 of 40.8 mm, a wall thickness 19 of 4.07 mm and a width 20 of 8.2 mm. The upper, smaller radius 21 is 14.06 mm and the lower, large radius 22 is 18.24 mm.

FIGS. 6a, 6b and 7a, 7b show the forming blocks 15.1, 15.2 of the forming die in a front view and top view. The parting line extends perpendicular to the height 18 of the cam ring 16 (FIG. 5). It is characteristic that the first forming block 15.1 shown at bottom has an inner contour 16.1 which corresponds to a half-circle. However, the second forming block 15.2 which cooperates with the first forming block 15.1 resembles a trapezoid; the open, long side 24 of the trapezoid faces the open side 25 of the first forming block 15.1. The shorter side 26 of the trapezoid is preferably curved in a slightly convex manner with a radius 1.5× the small radius 21. Two short straight portions 23, 23' adjoin this short side 26 and pass into a radial portion 27, 27' in a rounded manner. It is essential that the radius of this radial portion 27, 27' is greater than the radius of the half-circle of the first forming block 15.1. In order to reduce the stress peaks in the edge area 28, 28', the latter are designed in a special manner as shown by detail X in FIG. 8. The rounded edge area 28, 28' adjoins the curved portions of the half-circle with radius R and then passes into the front side 30 of the forming block 15.1. The transitions are characterized by rounded portions with radii $r_1$; $r_2$ which pass into one another.

REFERENCE NUMBERS

No.

1 pipe
2 outer diameter of pipe
3 wall thickness of pipe
4 ring blank
5 width of ring blank
6 outer diameter of ring blank
7 cutting roll
8.1; 8.2 tool (end face)
9 tool (inner contour)
10 tool (outer surface)
11 circular ring
12 outer diameter of circular ring
13 wall thickness of circular ring
14 width of circular ring
15.1; 15.2 forming block
16.1; 16.2 inner contour of forming block
17 cam ring
18 height of cam ring
19 wall thickness of cam ring
20 width of cam ring
21 small radius of cam ring
22 large radius of cam ring
23, 23' straight portion
24 open long side of trapezoid
25 open side of first forming block
26 short side of trapezoid
27, 27' radial portion
28, 28' edge area
30 front side of forming block

What is claimed is:

1. A method for producing non-rotationally symmetric metal cam rings with a constant wall thickness along their circumference, said method comprising:
   providing a hot-rolled pipe of roller bearing steel;
   severing ring blanks of equal width from said hot-rolled pipe;
   mechanically machining said ring blanks on all sides to produced machined ring blanks,
   cold forming said machined ring blanks to produce cam rings, wherein said cold forming is performed with a forming die having first and second forming blocks, the forming die having an inner contour approximating the finished contour of the cam rings, the first forming block having an inner contour which corresponds to a half circle, the second forming block having an inner contour which roughly corresponds to a trapezoid having a height which is greater than the radius of the half circle of the first forming block;
   hardening said cam rings; and
   tempering said cam rings.

2. A method according to claim 1 wherein the trapezoid has a closed short side which is curved in a slightly convex manner.

3. A method according to claim 2 wherein two short straight portions extend from the shorter side of the trapezoid and pass into a radial portion having a radius which is greater than the radius of the inner contour of the first forming block.

4. A method according to claim 1 wherein the height of the trapezoid extends vertical to the parting point of the forming blocks.

5. A method according to claim 1 wherein the height of the trapezoid extends parallel to the parting point of the forming blocks.

6. A method according to claim 1 wherein the inner contour of the two forming blocks is provided, respectively, with a rounded edge area in the area of the parting point.

* * * * *